(12) United States Patent
Bayley et al.

(10) Patent No.: US 8,455,171 B2
(45) Date of Patent: Jun. 4, 2013

(54) TONER COMPOSITIONS

(75) Inventors: Robert D. Bayley, Fairport, NY (US); Timothy L. Lincoln, Rochester, NY (US); Kevin F. Marcell, Webster, NY (US); Grazyna E. Kmiecik-Lawrynowicz, Fairport, NY (US); Maura A. Sweeney, Irondequoit, NY (US); Daniel W. Asarese, Honeoye Falls, NY (US); Chieh-Min Cheng, Rochester, NY (US); Zhen Lai, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 910 days.

(21) Appl. No.: 11/809,058

(22) Filed: May 31, 2007

(65) Prior Publication Data

US 2008/0299478 A1    Dec. 4, 2008

(51) Int. Cl.
*G03G 97/087* (2006.01)

(52) U.S. Cl.
USPC .................................. 430/137.15; 430/109.3

(58) Field of Classification Search
USPC ......................................... 430/109.3, 137.15
See application file for complete search history.

(56) References Cited

U.S. PATENT DOCUMENTS

| | | |
|---|---|---|
| 2,874,063 A | 3/1953 | Greig |
| 3,590,000 A | 6/1971 | Palermiti et al. |
| 3,655,374 A | 4/1972 | Palermiti et al. |
| 3,720,617 A | 3/1973 | Chatterji et al. |
| 3,944,493 A | 3/1976 | Jadwin et al. |
| 3,983,045 A | 9/1976 | Jugle et al. |
| 4,007,293 A | 2/1977 | Mincer et al. |
| 4,079,014 A | 3/1978 | Burness et al. |
| 4,265,990 A | 5/1981 | Stolka et al. |
| 4,394,430 A | 7/1983 | Jadwin et al. |
| 4,560,635 A | 12/1985 | Hoffend et al. |
| 4,563,408 A | 1/1986 | Lin et al. |
| 4,584,253 A | 4/1986 | Lin et al. |
| 4,797,339 A | 1/1989 | Maruyama et al. |
| 4,858,884 A | 8/1989 | Harwath |
| 4,935,326 A | 6/1990 | Creatura et al. |
| 4,937,166 A | 6/1990 | Creatura et al. |
| 4,983,488 A | 1/1991 | Tam et al. |
| 4,996,127 A | 2/1991 | Hasegawa et al. |
| 5,227,460 A | 7/1993 | Mahabadi et al. |
| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,650,255 A | 7/1997 | Ng et al. |
| 5,650,256 A | 7/1997 | Veregin et al. |
| 5,853,943 A | 12/1998 | Cheng et al. |
| 5,922,501 A * | 7/1999 | Cheng et al. .............. 430/137.14 |
| 6,004,714 A | 12/1999 | Ciccarelli et al. |
| 6,190,815 B1 | 2/2001 | Ciccarelli et al. |
| 6,458,501 B1 | 10/2002 | Cheng et al. |
| 6,503,680 B1 | 1/2003 | Chen et al. |
| 6,962,764 B2 | 11/2005 | Vanbesien et al. |
| 7,001,702 B2 | 2/2006 | Cheng et al. |
| 7,041,420 B2 | 5/2006 | Vandewincket et al. |
| 7,186,494 B2 | 3/2007 | Ahuja et al. |
| 7,279,261 B2 | 10/2007 | Lee et al. |
| 7,307,111 B2 | 12/2007 | Moffat et al. |
| 2002/0049275 A1 | 4/2002 | Cheng et al. |
| 2003/0215732 A1 * | 11/2003 | Uchida et al. .............. 430/110.3 |
| 2004/0202950 A1 | 10/2004 | Ahuja et al. |
| 2005/0137278 A1 | 6/2005 | Fromm et al. |
| 2006/0089425 A1 | 4/2006 | Chopra et al. |
| 2006/0121383 A1 | 6/2006 | Zwartz et al. |
| 2006/0172220 A1 | 8/2006 | Patel et al. |
| 2006/0240353 A1 | 10/2006 | Matsumura et al. |
| 2006/0257777 A1 | 11/2006 | Matsumura et al. |
| 2006/0269858 A1 | 11/2006 | McDougall et al. |
| 2007/0037086 A1 | 2/2007 | Skorokhod et al. |
| 2007/0166635 A1 | 7/2007 | Yamamoto et al. |
| 2007/0207400 A1 | 9/2007 | Ahuja et al. |

FOREIGN PATENT DOCUMENTS

EP    1 088 833 A    4/2001

OTHER PUBLICATIONS

European Search Report dated Sep. 10, 2008 for EP Application No. 08 15 2681.6.

* cited by examiner

*Primary Examiner* — Peter Vajda

(74) *Attorney, Agent, or Firm* — MDIP LLC

(57) ABSTRACT

The present disclosure provides processes for reducing the particle size of latex resins and toners produced with such resins. In embodiments, a carboxylic acid may be added to materials utilized to produce a latex and reduce the particle size of the resulting latex particles and toner particles. In accordance with the present disclosure, one may be able to utilize materials for the production of latex resins and toners which may otherwise produce particles that are too large in the absence of the carboxylic acid.

13 Claims, No Drawings

TONER COMPOSITIONS

CROSS-REFERENCE TO RELATED APPLICATIONS

This application is related to co-pending application entitled "Toner Compositions" filed concurrently herewith, under Express Mail Certificate No. EV929664641US application Ser. No. 11/809,124, the disclosure of which is hereby incorporated by reference in its entirety.

BACKGROUND

The present disclosure relates to processes useful in providing toners suitable for electrostatographic apparatuses, including xerographic apparatuses such as digital, image-on-image, and similar apparatuses.

Numerous processes are known for the preparation of toners, such as, for example, conventional processes wherein a resin is melt kneaded or extruded with a pigment, micronized and pulverized to provide toner particles. There are illustrated in U.S. Pat. Nos. 5,364,729 and 5,403,693, the disclosures of each of which are hereby incorporated by reference in their entirety, methods of preparing toner particles by blending together latexes with pigment particles. Also relevant are U.S. Pat. Nos. 4,996,127, 4,797,339 and 4,983,488, the disclosures of each of which are hereby incorporated by reference in their entirety.

Toner can also be produced by emulsion aggregation methods. Methods of preparing an emulsion aggregation (EA) type toner are known and toners may be formed by aggregating a colorant with a latex polymer formed by emulsion polymerization. For example, U.S. Pat. No. 5,853,943 the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 5,403,693, 5,418,108, 5,364,729, and 5,346,797, the disclosures of each of which are hereby incorporated by reference in their entirety. Other processes are disclosed in U.S. Pat. Nos. 5,527,658, 5,585,215, 5,650,255, 5,650,256 and 5,501,935 the disclosures of each of which are hereby incorporated by reference in their entirety.

One problem with the synthesis of toners is the variability of quality in the materials utilized to form the toners and latexes utilized therein. In some cases, this variability and the presence of impurities in the starting materials may result in the formation of toner particles that are too large in size and thus unsuitable for their intended use.

Improved methods for producing toner, which minimize sensitivity to variations in starting materials and are capable of utilizing existing processing equipment and machinery, remain desirable.

SUMMARY

The present disclosure provides processes for making latexes which, in turn, may be utilized to produce toners. Latexes and toners are also provided. In embodiments, the present disclosure provides processes including contacting a latex with a carboxylic acid and a stabilizer of the following formula:

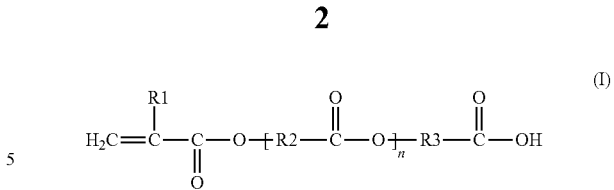

where R1 is a hydrogen or methyl group, R2 and R3 may be alkyl groups containing about 1 to about 12 carbon atoms or phenyl groups, and n is from about 0 to about 20, and recovering a resulting latex resin, wherein the carboxylic acid is present in an amount sufficient to reduce the particle size of the resulting latex resin.

In embodiments, the process may further include combining the carboxylic acid with the stabilizer and monomer components of the latex to form an emulsion, adding a portion of the emulsion to a reactor with an initiator to form a seed resin, and adding the remainder of the emulsion to the reactor to complete latex polymerization.

In other embodiments, the process may further include combining the carboxylic acid with monomer components of the latex to form an emulsion in a reactor, adding an initiator to the reactor to form a seed resin, combining the stabilizer with the monomer components of the latex to form a second emulsion, and adding the second emulsion to the reactor to complete latex polymerization.

In other embodiments, a process of the present disclosure may include contacting a latex including styrenes, acrylates, methacrylates, butadienes, isoprenes, acrylic acids, methacrylic acids, acrylonitriles, and combinations thereof with an acrylic acid and a stabilizer including beta carboxyethyl acrylate, and recovering a resulting latex resin, wherein the acrylic acid is present in an amount sufficient to reduce the particle size of the resulting latex resin.

As noted above, latexes and toners are also provided by the present disclosure. In embodiments, a toner may include a latex including styrenes, acrylates, methacrylates, butadienes, isoprenes, acrylic acids, methacrylic acids, acrylonitriles, and combinations thereof, a carboxylic acid present in an amount sufficient to reduce particle size of the latex, a stabilizer of the following formula:

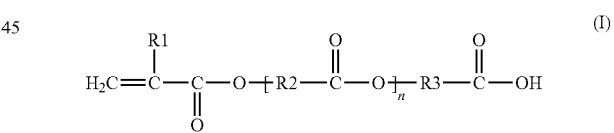

where R1 is a hydrogen or methyl group, R2 and R3 can be alkyl groups containing about 1 to about 12 carbon atoms or phenyl groups, and n is from about 0 to about 20, a colorant dispersion, and an optional wax dispersion.

DETAILED DESCRIPTION OF EMBODIMENTS

The present disclosure provides processes for the preparation of toner particles which may avoid problems which arise from the presence of impurities and/or variability in the materials utilized to prepare latex resins which, in turn, may be utilized to produce the toner particles. In embodiments, the toner particles of the present disclosure may be produced utilizing a carboxylic acid as part of a starting seed monomer in formation of the latex and/or combining a carboxylic acid with other materials to produce latex resins suitable for the production of toner particles having desired physical characteristics and morphologies. Surprisingly, it has been found that the addition of a carboxylic acid may produce latex resins and toners having suitable particle sizes, even where impurities or variability in the other starting materials might otherwise result in latex resins and toner particles having undesirable physical characteristics and morphologies, in embodiments particle sizes that are too large for use as toners.

Toners of the present disclosure may include a latex in combination with a pigment. While the latex may be prepared by any method within the purview of one skilled in the art, in embodiments the latex may be prepared by emulsion polymerization methods and the toner may include emulsion aggregation toners. Emulsion aggregation involves aggregation of both submicron latex and pigment particles into toner size particles, where the growth in particle size is, for example, from submicron, in embodiments from about 3 microns to about 10 microns. In embodiments, the latex and resulting toner may be produced by a semi-continuous polymerization process in which a seed particle is first formed, after which additional monomers and materials utilized to form the latex which, in turn, may be utilized to form toner particles of the present disclosure. In other embodiments, a batch emulsion polymerization process may be utilized to form a latex and resulting toner.

Resin

Any monomer suitable for preparing a latex emulsion can be used in the present processes. Suitable monomers useful in forming the latex emulsion, and thus the resulting latex particles in the latex emulsion include, but are not limited to, styrenes, acrylates, methacrylates, butadienes, isoprenes, acrylic acids, methacrylic acids, acrylonitriles, mixtures thereof, and the like.

In embodiments, the resin of the latex may include at least one polymer. In embodiments, at least one may be from about one to about twenty and, in embodiments, from about three to about ten. Exemplary polymers include copolymers of styrene and acrylates, copolymers of styrene and butadiene, copolymers of styrene and methacrylates, and more specifically, poly(styrene-co-alkyl acrylate), poly(styrene-co-butadiene), poly(styrene-co-alkyl methacrylate), poly (styrene-co-alkyl acrylate-co-acrylic acid), poly(styrene-co-1,3-butadiene-co-acrylic acid), poly (styrene-co-alkyl methacrylate-co-acrylic acid), poly(alkyl methacrylate-co-alkyl acrylate), poly(alkyl methacrylate-co-aryl acrylate), poly(aryl methacrylate-co-alkyl acrylate), poly(alkyl methacrylate-co-acrylic acid), poly(styrene-co-alkyl acrylate-co-acrylonitrile-acrylic acid), poly (styrene-co-butadiene-co-acrylonitrile-co-acrylic acid), poly(alkyl acrylate-co-acrylonitrile-co-acrylic acid), poly(methylstyrene-co-butadiene), poly(methyl methacrylate-co-butadiene), poly (ethyl methacrylate-co-butadiene), poly(propyl methacrylate-co-butadiene), poly(butyl methacrylate-co-butadiene), poly(methyl acrylate-co-butadiene), poly(ethyl acrylate-co-butadiene), poly(propyl acrylate-co-butadiene), poly(butyl acrylate-co-butadiene), poly(styrene-co-isoprene), poly(methylstyrene-co-isoprene), poly (methyl methacrylate-co-isoprene), poly(ethyl methacrylate-co-isoprene), poly(propyl methacrylate-co-isoprene), poly(butyl methacrylate-co-isoprene), poly(methyl acrylate-co-isoprene), poly(ethyl acrylate-co-isoprene), poly(propyl acrylate-co-isoprene), poly(butyl acrylate-co-isoprene), poly(styrene-co-propyl acrylate), poly(styrene-co-butyl acrylate), poly(styrene-co-butadiene-co-methacrylic acid), poly(styrene-co-butyl acrylate-co-acrylic acid), poly(styrene-co-butyl acrylate-co-methacrylic acid), poly(styrene-co-butyl acrylate-co-acrylonitrile), poly(styrene-co-butyl acrylate-co-acrylonitrile-acrylic acid), poly(styrene-co-butyl methacrylate), poly(styrene-co-butyl methacrylate-co-acrylic acid), poly(butyl methacrylate-co-butyl acrylate), poly(butyl methacrylate-co-acrylic acid), poly(acrylonitrile-co-butyl acrylate-co-acrylic acid), and mixtures and combinations thereof. The polymer may be block, random, grafting, or alternating copolymers. In addition, polyester resins obtained from the reaction of bisphenol A and propylene oxide or propylene carbonate, and in particular including such polyesters followed by the reaction of the resulting product with fumaric acid (as disclosed in U.S. Pat. No. 5,227,460, the entire disclosure of which is incorporated herein by reference), and branched polyester resins resulting from the reaction of dimethylterephthalate with 1,3-butanediol, 1,2-propanediol, and pentaerythritol, may also be used.

In embodiments, a poly(styrene-co-butyl acrylate) may be used as the latex resin. The glass transition temperature of this latex may be from about 35° C. to about 75° C., in embodiments from about 40° C. to about 65° C.

In embodiments, the latex may be prepared in an aqueous phase containing a surfactant or co-surfactant. Surfactants which may be utilized in the latex dispersion can be ionic or nonionic surfactants in an amount of from about 0.01 to about 15 weight percent of the solids, and in embodiments of from about 0.1 to about 10 weight percent of the solids.

Anionic surfactants which may be utilized include sulfates and sulfonates, disulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku Co., Ltd., mixtures thereof, and the like. Other suitable surfactants include, in embodiments, DOWFAX™ 2A1, an alkyldiphenyloxide disulfonate from The Dow Chemical Company, optionally in combination with any of the foregoing anionic surfactants.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and dodecyl trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, and the like, and mixtures thereof. In embodiments a suitable cationic surfactant includes SANISOL B-50 available from Kao Corp., which is primarily a benzyl dimethyl alkonium chloride.

Examples of nonionic surfactants include, but are not limited to alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, mixtures thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be selected.

The choice of particular surfactants or combinations thereof, as well as the amounts of each to be used, are within the purview of those skilled in the art.

In embodiments initiators may be added for formation of the latex. Examples of suitable initiators include water soluble initiators, such as ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate, and mixtures thereof. Other water-soluble initiators which may be utilized include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis [N-(4-hydroxyphenyl)-2-methyl-propionamidine] dihydrochloride, 2,2'-azobis[N-(4-amino-phenyl)-2-methylpropionamidine]tetrahydrochloride, 2,2'-azobis[2-methyl-N(phenylmethyl)propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis {2-[1-(2-hydroxyethyl)-2-imidazolin-2-yl]propane}dihydrochloride, combinations thereof, and the like.

Initiators can be added in suitable amounts, such as from about 0.1 to about 8 weight percent, and in embodiments of from about 0.2 to about 5 weight percent of the monomers.

In embodiments, chain transfer agents may be used including dodecane thiol, octane thiol, carbon tetrabromide, mixtures thereof, and the like, in amounts from about 0.05 to about 10 percent and, in embodiments, from about 0.1 to about 5 percent by weight of monomers, to control the molecular weight properties of the polymer when emulsion polymerization is conducted in accordance with the present disclosure.

Stabilizers

In embodiments, it may be advantageous to include a stabilizer when forming the toner. Suitable stabilizers include monomers having carboxylic acid functionality. In embodiments, suitable stabilizers may be of the following formula (1):

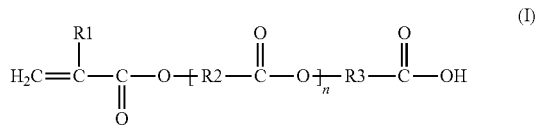

where R1 is hydrogen or a methyl group; R2 and R3 are independently selected from alkyl groups containing from about 1 to about 12 carbon atoms or a phenyl group; and n is from about 0 to about 20, in embodiments from about 1 to about 10. Examples of such stabilizers include beta carboxyethyl acrylate (sometimes referred to herein as poly(2-carboxyethyl) acrylate) (β-CEA), poly(2-carboxyethyl) acrylate, 2-carboxyethyl methacrylate, combinations thereof, and the like.

In embodiments, the stabilizer having carboxylic acid functionality may also contain metallic ions, such as sodium, potassium and/or calcium, to achieve better emulsion polymerization results. The metallic ions may be present in an amount from about 0.001 to about 10 percent by weight of the stabilizer having carboxylic acid functionality, in embodiments from about 0.5 to about 5 percent by weight of the stabilizer having carboxylic acid functionality.

It may be desirable, in embodiments, to include an acrylate such as a beta-carboxyethyl acrylate (β-CEA) in forming the latex. Thus, in embodiments, a poly(styrene-butyl acrylate-beta-carboxyethyl acrylate) may be utilized as the latex. The glass transition temperature of this latex may be from about 45° C. to about 65° C., in embodiments from about 48° C. to about 62° C.

One potential issue which may arise with the use of the above stabilizers is the variability which may occur in the formation of multiple batches of stabilizers. The consistency of the quality of the stabilizers may influence toner production, including the particle size of toners produced with these materials. For example, β-CEA may be produced from acrylic acid through a Michael addition reaction. Although reaction temperature can be an important factor in the carboxylic acid number of the β-CEA, with a higher temperature resulting in less carboxylic acid groups, in some cases with the same process time, the Michael reaction can proceed at room temperature, at a much lower reaction rate, resulting in more carboxylic acid groups.

The quality of the β-CEA may thus be inconsistent from batch to batch, especially with respect to the variability in the number of carboxylic acid groups which may result, in part, from different processing temperatures. For example, when β-CEA contains more carboxylic acid groups, latexes produced with such stabilizers may possess a larger particle size, which may interfere with the formation of toner particles in an emulsion aggregation process. Thus, poor quality β-CEA may cause problems with latex synthesis, including lower quality yield, wider latex particle size distribution, shorter latex shelf life, more reactor fouling, and difficulties in controlling reaction temperature due to higher exothermic reactions.

While beta-carboxyethyl acrylate may be utilized to form latexes suitable for forming toners in accordance with the present disclosure, as noted above, in some cases the β-CEA may possess impurities therein which result in toner particles of large sizes, in embodiments greater than about 300 nm, which may be undesirable. In accordance with the present disclosure, it has been surprisingly been found that problems with impurities in the β-CEA may be minimized or avoided, and toners with desirable particle sizes may be produced, by the addition of an acid to the β-CEA at the time of latex formation or, in other embodiments, by the use of an acid in the formation of a seed particle during a semi-continuous emulsion aggregation process.

Suitable acids which may be utilized to produce acceptable latex in accordance with the present disclosure, even where a stabilizer such as β-CEA known to otherwise produce toners having too large particle sizes is utilized, include, but are not limited to, carboxylic acids such as acrylic acid, methacrylic acid, itaconic acid, fumaric acid, maleic acid, cinnamic acid, combinations thereof, and the like. In embodiments, a carboxylic acid such as acrylic acid may be combined with a β-CEA known to produce particles that are too large, or the carboxylic acid such as acrylic acid may be utilized to form a seed particle during a semi-continuous emulsion aggregation process, after which the β-CEA known to produce particles that are too large is added. In either case, the use of the acid as disclosed herein minimizes the negative effects of the β-CEA and the resulting latex particles are of acceptable size for producing toners, in embodiments from about 80 nm to about 800 nm, in other embodiments from about 170 nm to about 240 nm.

The amount of acid added to minimize the negative effects of a bad stabilizer such as β-CEA known to otherwise produce particles that are too large will vary depending upon the stage of addition. Where utilized to form the seed particle, the amount of acid may be from about 0.001% to about 10% by weight of a monomer mixture utilized to form a seed, in embodiments from about 0.1% to about 5% by weight of a monomer mixture utilized to form a seed, which may include the monomers described above as suitable for forming the latex but, in embodiments, may not include the bad stabilizer noted above. Where the acid is added during the formation of resin particles, the amount of acid may be from about 0.001% to about 10% by weight of the mixture utilized to form the resin, in embodiments from about 0.1% to about 1% by weight of the mixture utilized to form the resin, which would include both the monomers and stabilizer such as β-CEA described above.

In the emulsion polymerization process, the reactants may be added to a suitable reactor, such as a mixing vessel. The appropriate amount of at least two monomers, in embodiments from about two to about ten monomers, stabilizer of the present disclosure, surfactant(s), initiator, if any, chain transfer agent, if any, and the like may be combined in the reactor and the emulsion polymerization process may be allowed to begin. Reaction conditions selected for effecting the emulsion polymerization include temperatures of, for example, from about 45° C. to about 120° C., in embodiments from about 60° C. to about 90° C.

After formation of the latex particles, the latex particles may be used to form a toner. In embodiments, the toners are an emulsion aggregation type toner that are prepared by the aggregation and fusion of the latex particles of the present disclosure with a colorant, and one or more additives such as stabilizers of the present disclosure, surfactants, coagulants, waxes, surface additives, and optionally mixtures thereof.

pH Adjustment Agent

In some embodiments a pH adjustment agent may be added to control the rate of the emulsion aggregation process. The pH adjustment agent utilized in the processes of the present disclosure can be any acid or base that does not adversely affect the products being produced. Suitable bases can include metal hydroxides, such as sodium hydroxide, potassium hydroxide, ammonium hydroxide, and optionally mixtures thereof. Suitable acids include nitric acid, sulfuric acid, hydrochloric acid, citric acid, acetic acid, and optionally mixtures thereof.

Wax

Wax dispersions may also be added to a latex to produce toners of the present disclosure. Suitable waxes include, for example, submicron wax particles in the size range of from about 50 to about 1000 nanometers, in embodiments of from about 100 to about 500 nanometers in volume average diameter, suspended in an aqueous phase of water and an ionic surfactant, nonionic surfactant, or mixtures thereof. Suitable surfactants include those described above. The ionic surfactant or nonionic surfactant may be present in an amount of from about 0.1 to about 20 percent by weight, and in embodiments of from about 0.5 to about 15 percent by weight of the wax.

The wax dispersion according to embodiments of the present disclosure may include, for example, a natural vegetable wax, natural animal wax, mineral wax, and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and mixtures thereof.

Examples of polypropylene and polyethylene waxes include those commercially available from Allied Chemical and Baker Petrolite, including POLYWAX 725®, a polyethylene wax from Baker Petrolite, wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasei K. K., and similar materials. In embodiments, commercially available polyethylene waxes possess a molecular weight (Mw) of from about 100 to about 5000, and in embodiments of from about 250 to about 2500, while the commercially available polypropylene waxes have a molecular weight of from about 200 to about 10,000, and in embodiments of from about 400 to about 5000.

In embodiments, the waxes may be functionalized. Examples of groups added to functionalize waxes include amines, amides, imides, esters, quaternary amines, and/or carboxylic acids in embodiments, the functionalized waxes may be acrylic polymer emulsions, for example, JONCRYL 74, 89, 130, 537, and 538, all available from SC Johnson Wax, or chlorinated polypropylenes and polyethylenes commercially available from Allied Chemical, Petrolite Corporation, and SC Johnson Wax.

The wax may be present in an amount of from about 0.1 to about 30 percent by weight, and in embodiments from about 2 to about 20 percent by weight of the toner.

Colorants

The latex particles may be added to a colorant dispersion. The colorant dispersion may include, for example, submicron colorant particles in a size range of, for example, from about 50 to about 500 nanometers and, in embodiments, of from about 100 to about 400 nanometers in volume average diameter. The colorant particles may be suspended in an aqueous water phase containing an anionic surfactant, a nonionic surfactant, or mixtures thereof. In embodiments, the surfactant may be ionic and may be from about 0.1 to about 25 percent by weight, and in embodiments from about 1 to about 15 percent by weight, of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants, and the like.

The colorant may be present in the toner of the disclosure in an amount of from about 1 to about 25 percent by weight of toner, in embodiments in an amount of from about 2 to about 15 percent by weight of the toner.

Exemplary colorants include carbon black like REGAL 330® magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP-604™, NP-608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido) phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight, in embodiments, from about 5 to about 20 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, and the like, and combinations thereof, may be utilized as the colorant.

The resulting blend of latex, optionally in a dispersion, and colorant dispersion may be stirred and heated to a temperature of from about 35° C. to about 70° C., in embodiments of from about 40° C. to about 65° C., resulting in toner aggregates of from about 2 microns to about 10 microns in volume average diameter, and in embodiments of from about 5 microns to about 8 microns in volume average diameter.

Coagulants

In embodiments, a coagulant may be added during or prior to aggregating the latex and the aqueous colorant dispersion. The coagulant may be added over a period of time from about 1 to about 60 minutes, in embodiments from about 1.25 to about 20 minutes, depending on the processing conditions.

Examples of coagulants include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate and the like. One suitable coagulant is PAC, which is commercially available and can be prepared by the controlled hydrolysis of aluminum chloride with sodium hydroxide. Generally, PAC can be prepared by the addition of two moles of a base to one mole of aluminum chloride. The species is soluble and stable when dissolved and stored under acidic conditions if the pH is less than about 5. The species in solution is believed to be of the formula $Al_{13}O_4(OH)_{24}(H_2O)_{12}$ with about 7 positive electrical charges per unit.

In embodiments, suitable coagulants include a polymetal salt such as, for example, polyaluminum chloride (PAC), polyaluminum bromide, or polyaluminum sulfosilicate. The polymetal salt can be in a solution of nitric acid, or other diluted acid solutions such as sulfuric acid, hydrochloric acid, citric acid or acetic acid. The coagulant may be added in amounts from about 0.01 to about 5 percent by weight of the toner, and in embodiments from about 0.1 to about 3 percent by weight of the toner.

Aggregating Agents

Any aggregating agent capable of causing complexation might be used in forming toner of the present disclosure. Both alkali earth metal or transition metal salts can be utilized as aggregating agents. In embodiments, alkali (II) salts can be selected to aggregate sodio sulfonated polyester colloids with a colorant to enable the formation of a toner composite. Such salts include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, and optionally mixtures thereof. Examples of transition metal salts or anions which may be utilized as aggregating agent include acetates of vanadium, niobium, tantalum, chromium, molybdenum, tungsten, manganese, iron, ruthenium, cobalt, nickel, copper, zinc, cadmium or silver; acetoacetates of vanadium, niobium, tantalum, chromium, molybdenum, tungsten, manganese, iron, ruthenium, cobalt, nickel, copper, zinc, cadmium or silver; sulfates of vanadium, niobium, tantalum, chromium, molybdenum, tungsten, manganese, iron, ruthenium, cobalt, nickel, copper, zinc, cadmium or silver; and aluminum salts such as aluminum acetate, aluminum halides such as polyaluminum chloride, mixtures thereof, and the like.

Neutralizing bases that may be utilized in the toner formulation processes include bases such as metal hydroxides, including sodium hydroxide, potassium hydroxide, ammonium hydroxide, and optionally mixtures thereof. Also useful as a neutralizer is a composition containing sodium silicate dissolved in sodium hydroxide.

Additives

The toner may also include charge additives in effective amounts of, for example, from about 0.1 to about 10 weight percent, in embodiments from about 0.5 to about 7 weight percent. Suitable charge additives include alkyl pyridinium halides, bisulfates, the charge control additives of U.S. Pat. Nos. 3,944,493; 4,007,293; 4,079,014; 4,394,430 and 4,560,635, the entire disclosures of each of which are hereby incorporated by reference in their entirety, negative charge enhancing additives like aluminum complexes, any other charge additives, mixtures thereof, and the like.

Further optional additives include any additive to enhance the properties of toner compositions. Included are surface additives, color enhancers, etc. Surface additives that can be added to the toner compositions after washing or drying include, for example, metal salts, metal salts of fatty acids, colloidal silicas, metal oxides, strontium titanates, mixtures thereof, and the like, which additives are each usually present in an amount of from about 0.1 to about 10 weight percent, in embodiments from about 0.5 to about 7 weight percent of the toner. Examples of such additives include, for example, those disclosed in U.S. Pat. Nos. 3,590,000, 3,720,617, 3,655,374 and 3,983,045, the disclosures of each of which are hereby incorporated by reference in their entirety. Other additives include zinc stearate and AEROSIL R972® available from Degussa. The coated silicas of U.S. Pat. Nos. 6,190,815 and U.S. Pat. No. 6,004,714, the disclosures of each of which are hereby incorporated by reference in their entirety, can also be selected in amounts, for example, of from about 0.05 to about 5 percent by weight, in embodiments from about 0.1 to about 2 percent by weight of the toner, which additives can be added during the aggregation or blended into the formed toner product.

Once the appropriate final size of the toner particles is achieved, the pH of the mixture may be adjusted with a base to a value of from about 3.5 to about 7, and in embodiments from about 4 to about 6.5. The base may include any suitable base such as, for example, alkali metal hydroxides such as, for example, sodium hydroxide, potassium hydroxide, and ammonium hydroxide. The alkali metal hydroxide may be added in amounts from about 0.1 to about 30 percent by weight of the mixture, in embodiments from about 0.5 to about 15 percent by weight of the mixture.

The resultant blend of latex, optionally in a dispersion, stabilizer of the present disclosure, optional wax, colorant dispersion, optional coagulant, and optional aggregating agent, may then be stirred and heated to a temperature below the Tg of the latex, in embodiments from about 30° C. to about 70° C., in embodiments of from about 40° C. to about 65° C., for a period of time from about 0.2 hours to about 6 hours, in embodiments from about 0.3 hour to about 5 hours.

In embodiments, a shell may then be formed on the aggregated particles. Any latex utilized noted above to form the core latex may be utilized to form the shell latex. In embodiments, a styrene-n-butyl acrylate copolymer may be utilized to form the shell latex. In embodiments, the latex utilized to form the shell may have a glass transition temperature of from about 35° C. to about 75° C., in embodiments from about 40° C. to about 70° C.

Where used, the shell latex may be applied by any method within the purview of those skilled in the art, including dipping, spraying, and the like. The shell latex may be applied until the desired final size of the toner particles is achieved, in embodiments from about 2 microns to about 10 microns, in other embodiments from about 4 microns to about 8 microns. In other embodiments, the toner particles may be prepared by in-situ seeded semi-continuous emulsion copolymerization of the latex in which the alkaline resin may be added during shell synthesis. Thus, in embodiments, the toner particles may be prepared by in-situ seeded semi-continuous emulsion copolymerization of styrene and n-butyl acrylate (BA), in which calcium resinate may be introduced at the later stage of reaction for the shell synthesis.

The mixture of latex, colorant, optional wax, and any additives, is subsequently coalesced. Coalescing may include stirring and heating at a temperature of from about 80° C. to about 99° C., for a period of from about 0.5 to about 12 hours, and in embodiments from about 1 to about 6 hours. Coalescing may be accelerated by additional stirring.

In embodiments, the pH of the mixture may then be lowered to from about 3.5 to about 6 and, in embodiments, to from about 3.7 to about 5.5 with, for example, an acid, to further coalesce the toner aggregates. Suitable acids include, for example, nitric acid, sulfuric acid, hydrochloric acid, citric acid or acetic acid. The amount of acid added may be from about 0.1 to about 30 percent by weight of the mixture, and in embodiments from about 1 to about 20 percent by weight of the mixture.

The mixture is cooled, washed and dried. Cooling may be at a temperature of from about 20° C. to about 40° C., in embodiments from about 22° C. to about 30° C. over a period time from about 1 hour to about 8 hours, and in embodiments from about 1.5 hours to about 5 hours.

In embodiments, cooling a coalesced toner slurry includes quenching by adding a cooling media such as, for example, ice, dry ice and the like, to effect rapid cooling to a temperature of from about 20° C. to about 40° C., and in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture is not feasible nor practical, neither by the introduction of a cooling medium into the toner mixture, nor by the use of jacketed reactor cooling.

The toner slurry may then be washed. The washing may be carried out at a pH of from about 7 to about 12, and in embodiments at a pH of from about 9 to about 11. The washing may be at a temperature of from about 30° C. to about 70° C., and in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less then about 0.7% by weight.

The toner of the present disclosure may have particles with a circularity of from about 0.9 to about 0.99, and in embodiments of from about 0.94 to about 0.98. When the spherical toner particles have a circularity in this range, the spherical toner particles remaining on the surface of the image holding member pass between the contacting portions of the imaging holding member and the contact charger, the amount of deformed toner is small, and therefore generation of toner filming can be prevented so that a stable image quality without defects can be obtained over a long period.

Uses

Toner in accordance with the present disclosure can be used in a variety of imaging devices including printers, copy machines, and the like. The toners generated in accordance with the present disclosure are excellent for imaging processes, especially xerographic processes, which may operate with a toner transfer efficiency in excess of about 90 percent, such as those with a compact machine design without a cleaner or those that are designed to provide high quality colored images with excellent image resolution, acceptable signal-to-noise ratio, and image uniformity. Further, toners of the present disclosure can be selected for electrophotographic imaging and printing processes such as digital imaging systems and processes.

The imaging process includes the generation of an image in an electronic printing apparatus and thereafter developing the image with a toner composition of the present disclosure. The formation and development of images on the surface of photoconductive materials by electrostatic means is well known. The basic xerographic process involves placing a uniform electrostatic charge on a photoconductive insulating layer, exposing the layer to a light and shadow image to dissipate the charge on the areas of the layer exposed to the light and developing the resulting latent electrostatic image by depositing on the image a finely-divided electroscopic material referred to in the art as "toner". The toner will normally be attracted to the discharged areas of the layer, thereby forming a toner image corresponding to the latent electrostatic image. This powder image may then be transferred to a support surface such as paper. The transferred image may subsequently be permanently affixed to the support surface as by heat.

Developer compositions can be prepared by mixing the toners obtained with the embodiments of the present disclosure with known carrier particles, including coated carriers, such as steel, ferrites, and the like. See, for example, U.S. Pat. Nos. 4,937,166 and 4,935,326, the disclosures of each of which are hereby incorporated by reference in their entirety. The toner-to-carrier mass ratio of such developers may be from about 2 to about 20 percent, and in embodiments from about 2.5 to about 5 percent of the developer composition. The carrier particles can include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidene fluoride, mixtures of resins not in close proximity in the triboelectric series such as polyvinylidene fluoride and acrylics, thermosetting resins such as acrylics, mixtures thereof and other known components.

Development may occur via discharge area development. In discharge area development, the photoreceptor is charged and then the areas to be developed are discharged. The development fields and toner charges are such that toner is repelled by the charged areas on the photoreceptor and attracted to the discharged areas. This development process is used in laser scanners.

Development may be accomplished by the magnetic brush development process disclosed in U.S. Pat. No. 2,874,063, the disclosure of which is hereby incorporated by reference in its entirety. This method entails the carrying of a developer material containing toner of the present disclosure and magnetic carrier particles by a magnet. The magnetic field of the magnet causes alignment of the magnetic carriers in a brush like configuration, and this "magnetic brush" is brought into contact with the electrostatic image bearing surface of the photoreceptor. The toner particles are drawn from the brush to the electrostatic image by electrostatic attraction to the discharged areas of the photoreceptor, and development of the image results. In embodiments, the conductive magnetic brush process is used wherein the developer comprises conductive carrier particles and is capable of conducting an electric current between the biased magnet through the carrier particles to the photoreceptor.

Imaging

Imaging methods are also envisioned with the toners disclosed herein. Such methods include, for example, some of the above patents mentioned above and U.S. Pat. Nos. 4,265, 990, 4,858,884, 4,584,253 and 4,563,408, the entire disclosures of each of which are incorporated herein by reference. The imaging process includes the generation of an image in an electronic printing magnetic image character recognition apparatus and thereafter developing the image with a toner composition of the present disclosure. The formation and development of images on the surface of photoconductive materials by electrostatic means is well known. The basic xerographic process involves placing a uniform electrostatic charge on a photoconductive insulating layer, exposing the layer to a light and shadow image to dissipate the charge on the areas of the layer exposed to the light, and developing the resulting latent electrostatic image by depositing on the image a finely-divided electroscopic material, for example, toner. The toner will normally be attracted to those areas of the layer, which retain a charge, thereby forming a toner image corresponding to the latent electrostatic image. This powder image may then be transferred to a support surface such as paper. The transferred image may subsequently be permanently affixed to the support surface by heat. Instead of latent image formation by uniformly charging the photoconductive layer and then exposing the layer to a light and shadow image, one may form the latent image by directly charging the layer in image configuration. Thereafter, the powder image may be fixed to the photoconductive layer, eliminating the powder image transfer. Other suitable fixing means such as solvent or overcoating treatment may be substituted for the foregoing heat fixing step.

The following Examples are being submitted to illustrate embodiments of the present disclosure. These Examples are intended to be illustrative only and are not intended to limit the scope of the present disclosure. Also, parts and percentages are by weight unless otherwise indicated.

EXAMPLES

Comparative Example 1

Control latex. A latex resin was prepared by semicontinuous emulsion polymerization of styrene/butyl acrylate/β-carboxyethyl acrylate, at a ratio of about 75/25/3 parts by weight, using a diphenyloxide disulfonate surfactant. The β-carboxyethyl acrylate utilized to produce these samples was known to produce latexes possessing acceptable particle sizes.

The polymerization conditions were as follows. An 8 liter jacketed glass reactor was fitted with two stainless steel 45° pitch semi-axial flow impellers, a thermal couple temperature probe, a water cooled condenser with nitrogen outlet, a nitrogen inlet, internal cooling capabilities, and a hot water circulating bath. After reaching a jacket temperature of about 82° C. and continuous nitrogen purge, the reactor was charged with about 1779.98 grams of distilled water and about 2.89 grams of DOWFAX™ 2A1, an alkyldiphenyloxide disulfonate from The Dow Chemical Company. The stirrer was set at about 200 revolutions per minute (rpm) and maintained at this speed for about 2 hours with the reactor contents kept at a temperature of about 75° C. with the internal cooling system.

A monomer emulsion was prepared by combining about 1458.7 grams of styrene, about 486.2 grams of n-butyl acrylate, about 58.4 grams of β-carboxyethyl acrylate, and about 9.7 grams of dodecylmercaptan, with an aqueous solution of about 38.4 grams of DOWFAX™ 2A1, and about 921.5 grams of distilled water. The mixture was then subjected to a series of on/off high shear mixing at a rate of about 400 rpm to form a stable emulsion.

About 148.7 grams of this stable emulsion was transferred into the reactor and stirred for about 10 minutes to maintain stable emulsion and allow reactor contents to equilibrate at about 75° C. An initiator solution prepared from about 38.9 grams of ammonium persulfate in about 134.7 grams of distilled water was then added over a period of about 20 minutes by pump to the reactor contents. This was immediately followed by flushing the pump with about 9.5 grams of distilled water into the reactor. Stirring continued for about an additional 20 minutes to complete seed particle formation. The remaining monomer emulsion, about 2824.3 grams, was then fed continuously into the reactor over a period of about 185 minutes, followed by an additional distilled water flush of about 45 grams.

After the addition of the monomer emulsion was completed, the reaction was allowed to post react for about 180 minutes at about 75° C. At this time the reactor and contents were cooled to room temperature and the latex removed.

The resulting latex polymer possessed an Mw of about 54,500, an Mn of about 20,900, as determined by gel permeation chromatography (GPC), and an onset Tg of about 56.5° C. as determined by differential scanning calorimetry (DSC). The resulting latex resin possessed a volume average diameter of about 228 nanometers measured on a Honeywell MICROTRAC® UPA 150 light scattering instrument.

Several samples were prepared as per the above synthesis to confirm the reproducibility of the particle sizes obtained; they are referred to herein as Control A1, Control A2, Control A3, Control A4, and Control A5.

Comparative Example 2

Control latex. Two latex samples were prepared by semicontinuous emulsion polymerization utilizing the process and set-up described above in Comparative Example 1. Here, the two control latexes included styrene/butyl acrylate/β-carboxyethyl acrylate, at ratio of about 75/25/3 parts by weight, using a diphenyloxide disulfonate surfactant. The β-carboxyethyl acrylate utilized to produce these samples was known to produce latex samples possessing unacceptable particle sizes, i.e. latex samples having particles that were too large, not meeting size specifications. Two different lots of β-carboxyethyl acrylate were utilized, both from the same source of production.

A first monomer emulsion was prepared by combining about 1458.7 grams of styrene, about 486.2 grams of n-butyl acrylate, about 58.4 grams of β-carboxyethyl acrylate and about 9.7 grams of dodecylmercaptan, with an aqueous solution of about 38.4 grams of DOWFAX™ 2A1 and about 921.5 grams of distilled water. The mixture was then subjected to a series of on/off high shear mixing at a rate of about 400 rpm to form a stable emulsion.

The second monomer emulsion was prepared by combining about 1458.7 grams of styrene, about 486.2 grams of n-butyl acrylate, about 58.4 grams of β-carboxyethyl acrylate and about 9.72 grams of dodecylmercaptan, with an aqueous solution of about 38.8 grams of DOWFAX™ 2A1 and about 921.5 grams of distilled water. The mixture was then subjected to a series of on/off high shear mixing at a rate of about 400 rpm to form a stable emulsion.

For each of the above samples, about 148.7 grams was transferred into the reactor, as set up in Comparative Example 1, stirred for about 10 minutes to maintain stable emulsion and allow reactor contents to equilibrate at about 75° C. An initiator solution prepared from about 29.17 grams of ammonium persulfate in about 134.7 grams of distilled water was then added over a period of about 20 minutes by pump to the reactor contents. This was immediately followed by flushing the pump with about 9.5 grams of distilled water into the reactor. Stirring continued for about an additional 20 minutes to complete seed particle formation. The remaining monomer emulsion, about 2824.3 grams, was then fed continuously into the reactor over a period of about 185 minutes, followed by an additional distilled water flush of about 45 grams.

After the addition of the monomer emulsion was completed, the reaction was allowed to post react for minimum of about 180 minutes at about 75° C. At this time the reactor and contents were cooled to room temperature and the latex removed.

The resulting latex resin produced with the first lot of β-carboxyethyl acrylate, referred to herein as control B1, possessed an Mw of about 54,600, an Mn of about 19,600 as determined by GPC, a second heat onset Tg of about 57.9° C. as determined by DSC, and a volume average of about 260 nanometers as measured on a Honeywell MICROTRAC® UPA 150 light scattering instrument. The resulting latex resin produced with the second lot of β-carboxyethyl acrylate, referred to herein as control B2, possessed an Mw of about 51,400, an Mn of about 20,100 as determined by GPC, a second heat onset Tg of about 54.2° C. as determined by DSC, and a volume average diameter of about 299 nanometers as measured on a Honeywell MICROTRAC® UPA 150 light scattering instrument.

Comparative Example 3

Control latex. Two latexes were prepared by semicontinuous emulsion polymerization utilizing the process and set-up described above in Comparative Example 1. Here, the two control latexes included styrene/butyl acrylate/acrylic acid, at a ratio of about 75/25/3 and 75/25/1.5 parts by weight, using a diphenyloxide disulfonate surfactant as described above. No β-carboxyethyl acrylate was utilized to produce these samples; rather, one utilized 3% acrylic acid and the other utilized 1.5% acrylic acid.

The monomer emulsion for the 3% acrylic acid sample was prepared by combining about 58.7 grams of styrene, about 486.2 grams of n-butyl acrylate, about 58.4 grams of acrylic acid, and about 9.7 grams of dodecylmercaptan, with an aqueous solution of about 38.4 grams of DOWFAX™ 2A1, and about 921.5 grams of distilled water. The mixture was then subjected to a series of on/off high shear mixing at a rate of about 400 rpm to form a stable emulsion.

The reactor, as in Comparative Example 1, was charged with about 1779.98 grams of distilled water and about 2.89 grams of DOWFAX™ 2A1. The stirrer was set at about 200 rpm and maintained at this speed for about 2 hours with the reactor contents kept at a temperature of about 75° C. with the internal cooling system.

About 148.6 grams of this stable emulsion was transferred into the reactor and stirred for about 10 minutes to maintain a stable emulsion and allow the reactor contents to equilibrate at about 75° C. An initiator solution prepared from about 38.9 grams of ammonium persulfate in about 134.7 grams of distilled water was then added over a period of about 20 minutes by pump to the reactor contents. This was immediately followed by flushing the pump with about 9.5 grams of distilled water into the reactor. Stirring continued for about an additional 20 minutes to complete seed particle formation. The remaining monomer emulsion, about 2824.3 grams, was then fed continuously into the reactor over a period of about 185 minutes, followed by an additional distilled water flush of about 45 grams.

After the addition of the monomer emulsion was completed, the reaction was allowed to post react for about 180 minutes at about 75° C. At this time the reactor and contents were cooled to room temperature and the latex removed.

The monomer emulsion for the 1.5% acrylic acid sample was prepared by combining about 1467.2 grams of styrene, about 489.1 grams of n-butyl acrylate, about 29.3 grams of acrylic acid, and about 9.8 grams of dodecylmercaptan, with an aqueous solution of about 38.7 grams of DOWFAX™ 2A1, and about 949.6 grams of distilled water. The mixture was then subjected to a series of on/off high shear mixing at a rate of about 400 rpm to form a stable emulsion.

The reactor, as in Comparative Example 1, was charged with about 1790.4 grams of distilled water and about 2.9 grams of DOWFAX™ 2A1. The stirrer was set at about 200 rpm and maintained at this speed for about 2 hours with the reactor contents kept at a temperature of about 75° C. with the internal cooling system.

About 149.2 grams of this stable emulsion was transferred into the reactor and stirred for about 10 minutes to maintain a stable emulsion and allow the reactor contents to equilibrate at about 75° C. An initiator solution prepared from about 39.1 grams of ammonium persulfate in about 135.5 grams of distilled water was then added over a period of about 20 minutes by pump to the reactor contents. This was immediately followed by flushing the pump with about 9.6 grams of distilled water into the reactor. Stirring continued for about an additional 20 minutes to complete seed particle formation. The remaining monomer emulsion, about 2824.3 grams, was then fed continuously into the reactor over a period of about 187 minutes, followed by an additional distilled water flush of about 45 grams.

After the addition of the monomer emulsion was completed, the reaction was allowed to post react for about 165 minutes at about 75° C. At this time the reactor and contents were cooled to room temperature and the latex removed.

The only difference in the above two samples was the acrylic acid concentration and the total weight of the latex that was synthesized. The 3% acrylic acid dispersion produced 4984.1 grams of latex and the 1.5% acrylic acid dispersion produced 5006.7 grams of latex.

The resulting latex polymer having 3% acrylic acid possessed an Mw of about 54,000, an Mn of about 15,900 as determined by GPC, and a second heat onset Tg of about 55.8° C. as determined by DSC. The resulting latex polymer having 1.5% acrylic acid possessed an Mw of about 52,500, an Mn of about 15.2 as determined by GPC, and a second heat onset Tg of about 56.3° C. as determined by DSC. The latex resin having about 3% acrylic acid, referred to herein as Control C1, possessed a volume average diameter of about 231 nanometers measured on a Honeywell MICROTRAC® UPA 150 light scattering instrument, while the latex possessing about 1.5% acrylic acid, referred to herein as Control C2, possessed a volume average diameter of about 222 nanometers.

Example 1

A latex of the present disclosure was prepared by semicontinuous emulsion polymerization of styrene/butyl acrylate/β-carboxyethyl acrylate/acrylic acid, at a ratio of about 75/25/2/0.5 parts by weight, using a diphenyloxide disulfonate surfactant utilizing the process and set-up described above in Comparative Example 1. The β-carboxyethyl acrylate utilized to produce these samples was known to produce latex samples possessing unacceptable particle sizes, i.e. latex samples having particles that were too large, not meeting size specifications; it was the first β-carboxyethyl acrylate (utilized in control B1), described above in Comparative Example 2.

The monomer emulsion was prepared by combining about 1458.7 grams of styrene, about 486.2 grams of n-butyl acrylate, about 38.9 grams of β-carboxyethyl acrylate, about 9.7 grams of acrylic acid and about 9.7 grams of dodecylmercaptan, with an aqueous solution of about 38.4 grams of DOWFAX™ 2A1, and about 921.49 grams of distilled water. The mixture was then subjected to a series of on/off high shear mixing at a rate of about 400 rpm to form a stable emulsion.

The reactor, as in Comparative Example 1, was charged with about 1780 grams of distilled water and about 2.9 grams of DOWFAX™ 2A1. The stirrer was set at about 200 rpm and maintained at this speed for about 2 hours with the reactor contents kept at a temperature of about 75° C. with the internal cooling system.

About 148.2 grams of this stable emulsion was transferred into the reactor and stirred for about 10 minutes to maintain a stable emulsion and allow the reactor contents to equilibrate at about 75° C. An initiator solution prepared from about 29.17 grams of ammonium persulfate in about 134.7 grams of distilled water was then added over a period of about 20 minutes by pump to the reactor contents. This was immediately followed by flushing the pump with about 9.5 grams of distilled water into the reactor. Stirring continued for about an additional 20 minutes to complete seed particle formation. The remaining monomer emulsion, about 2815 grams, was then fed continuously into the reactor over a period of about 187 minutes, followed by an additional distilled water flush of about 45 grams.

After the addition of the monomer emulsion was completed, the reaction was allowed to post react for about 194 minutes at about 75° C. At this time the reactor and contents were cooled to room temperature and the latex removed.

The resulting latex polymer possessed an Mw of about 54,000, an Mn of about 15,200 as determined by GPC, and a second heat onset Tg of about 54° C. as determined by DSC. The resulting latex resin possessed a volume average diameter of about 230 nanometers measured on a Honeywell MICROTRAC® UPA 150 light scattering instrument.

The particle sizes obtained for the various samples produced in the above Comparative Examples and Example 1 are summarized below in Table 1.

TABLE 1

| Sample Name | Particle size nm |
|---|---|
| Control C2 | 222 |
| Control C1 | 231 |
| Control A1 | 223 |
| Control A2 | 230 |
| Control A3 | 235 |
| Control A4 | 222 |
| Control A5 | 228 |
| Control B1 | 260 |
| Control B2 | 299 |
| Example 1 | 230 |

Surprisingly, as can be seen from the above table, even though the latex of Example 1 utilized a β-carboxyethyl acrylate known to produce latex samples possessing unacceptable particle sizes (see control B1), the addition of acrylic acid resulted in the production of a latex having acceptable, smaller particle sizes compared with the control latexes produced with the same β-carboxyethyl acrylate without the addition of acrylic acid.

Example 2

A latex was prepared by semi-continuous emulsion polymerization of styrene/butyl acrylate/β-carboxyethylacrylate, 75/25/3 parts (by weight), and using a diphenyloxide disulfonate surfactant following the general reaction conditions described above in Comparative Example 1. However, in this Example the seed monomer included acrylic acid, but no β-carboxyethyl acrylate. The β-carboxyethyl acrylate utilized to produce these samples was known to produce toner samples possessing unacceptable particle sizes, i.e. toner samples having particles that were too large; it was the first β-carboxyethyl acrylate (control B1), described above in Comparative Example 2.

The general reaction scheme for forming this latex was as follows. An 8 liter jacketed glass reactor was fitted with two stainless steel 45° pitch semi-axial flow impellers, a thermal couple temperature probe, a water cooled condenser with nitrogen outlet, a nitrogen inlet, internal cooling capabilities, and a hot water circulating bath. After reaching a jacket temperature of about 82° C. and continuous nitrogen purge, the reactor was charged with about 1799.71 grams of distilled water and about 2.92 grams of DOWFAX™ 2A1. The stirrer was set at about 200 rpm and maintained at this speed for about 2 hours with the reactor contents kept at a temperature of about 75° C. with the internal cooling system.

A seed monomer emulsion was prepared by combining about 74.47 grams of styrene, about 24.82 grams of n-butyl acrylate, about 1.49 grams of acrylic acid, and about 0.5 grams of dodecylmercaptan, with an aqueous solution of about 1.96 grams of DOWFAX™ 2A1, and about 46.58 grams of distilled water. The mixture was subjected to vigorous shaking to homogenize the mixture and transferred to the reactor and stirred for about 10 minutes to further emulsify and allow the reactor contents to equilibrate at about 75° C. An initiator solution prepared from about 29.5 grams of ammonium persulfate in about 136.19 grams of distilled water was then added over a period of about 20 minutes by pump to the reactor contents. This was immediately followed by flushing the pump with about 9.6 grams of distilled water into the reactor. Stirring continued for about an additional 20 minutes to allow seed particle formation.

A monomer emulsion feed was separately prepared by combining about 1401.11 grams of styrene, about 467.04 grams of n-butyl acrylate, about 56.04 grams of β-carboxyethylacrylate, and 9.34 grams of dodecylmercaptan, with an aqueous solution of 36.90 grams of DOWFAX™ 2A1, and 885.12 grams of distilled water. The mixture was then subjected to a series of on/off higher mixing at about 400 rpm to form a stable emulsion.

About 2855.56 grams of the above monomer emulsion was fed continuously into the reactor possessing the seed monomer emulsion described above, over a period of about 185 minutes, followed immediately by an additional distilled water flush of about 45 grams. After monomer emulsion addition was completed, the reaction was allowed to post react for about 180 minutes at about 75° C. At this time the reactor and its contents were cooled to room temperature and the latex removed.

The resulting latex polymer possessed an Mw of about 54,100, a Mn of about 20,000 as determined by GPC, and an onset Tg of about 55.7° C. by DSC. The latex resin possessed a volume average diameter of about 191 nanometers as measured on a Honeywell MICROTRAC® UPA 150 light scattering instrument.

Control samples were prepared as described above without utilizing acrylic acid in the seed resin. The ratio of styrene/n-butylacrylate, the seed size utilized to produce the latex (% by weight of monomer mixture utilized to form seed compared with total weight of mixture), and the amounts of ammonium persulfate (aps) utilized were varied. Control D2 utilized the same monomer mixture as Control B1 above. Details of these control samples, including their components and amounts thereof, as well as the sample produced by this Example, are detailed Table 2:

TABLE 2

| Sample ID | Styrene/ Butylacrylate Ratio | SEED WEIGHT % | % aps | Seed size Nm | Final Size Nm |
|---|---|---|---|---|---|
| Control D1 | 81.7:18.3 | 1 | 1.5 | 42 | 281 |
| Control D2 (utilizing the same latex as Control B1 above) | 75:25 | 5 | 2 | 85 | 260 |
| Control D3 | 75:25 | 5 | 2 | 86 | 265 |
| Example 2 | 75:25 | 5 | 1.5 | 62 | 191 |

As is apparent from the above table, control D1 had about a 1% seed weight, i.e., 1% of the total weight of the monomer mixture was utilized to form the seed particle, and a particle size of about 281 nm. While increasing the seed particle size to about 5% seed weight lowered the final particle size (control D2 and control D3), the particle size of the resulting latex was still unacceptably large. While the resin produced in this Example in accordance with the present disclosure utilized the same bad β-carboxyethylacrylate in the main monomer feed, the use of acrylic acid in the seed showed a dramatic effect in improved, i.e., smaller, particle size, as is apparent in comparison with control D2 and control D3. Thus, utilizing the methods of the present disclosure, one can start with a lower seed weight of from about 1% to about 3% and still obtain a desired, smaller particle size.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising;
   contacting a latex with compounds consisting of a separate carboxylic acid and a stabilizer of the following formula:

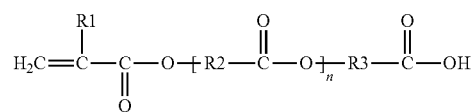

wherein R1 is a hydrogen or methyl group; R2 and R3 are independently selected from alkyl groups containing about 1 to about 12 carbon atoms and a phenyl group; and n is from about 0 to about 20;

recovering a resulting latex resin, wherein when said latex is contacted with said stabilizer in the absence of said separate carboxylic acid, a resin of larger particle size is produced, and when said latex is contacted with said stabilizer and with said separate carboxylic acid, a resin of smaller particle size is produced;

and contacting the latex resin with a colorant dispersion, and an optional wax dispersion to form toner particles having a volume average diameter of from about 2 micros to about 10 microns, and a circularity from about 0.9 to about 0.99, wherein the carboxylic acid is present in an amount of from about 0.001% to about 10% by weight of the latex.

2. The process of claim 1, further comprising:

combining the carboxylic acid with the stabilizer and monomer components of the latex to form an emulsion;

adding a portion of the emulsion to a reactor with an initiator to form a seed resin; and adding the remainder of the emulsion to the reactor to complete latex polymerization.

3. The process of claim 1, further comprising:

combining the carboxylic acid with monomer components of the latex to form an emulsion in a reactor;

adding an initiator to the reactor to form a seed;

combining the stabilizer with the monomer components of the latex to form a second emulsion and adding the second emulsion to the reactor to complete latex polymerization.

4. The process of claim 1, wherein the stabilizer is selected from the group consisting of beta carboxyethyl acrylate, poly(2-carboxyethyl)acrylate, and 2-carboxyethyl methacrylate.

5. The process of claim 1, wherein the latex is selected from the group consisting of styrene, acrylates, methacrylates, butadienes, isoprenes, acrylic acids, methacrylic acids, acrylonitriles, and combinations thereof.

6. The process of claim 1, wherein the latex is selected from the group consisting of poly(styrene-co-alkyl acrylate), poly(styrene-co-butadiene), poly(styrene-co-alkyl methacrylate), poly(styrene-co-alkyl acrylate-co-acrylic acid), poly(styrene-co-1,3-butadiene-co-acrylic acid), poly(styrene-co-alkyl methacrylate-co-acrylic acid), poly(alkyl methacrylate-co-alkyl acrylate), poly(alkyl methacrylate-co-aryl acrylate), poly(aryl methacrylate-co-alkyl acrylate), poly(alkyl methacrylate-co-acrylic acid), poly(styrene-coalkyl acrylate-co-acrylonitrile-acrylic acid), poly(styrene-co-butadiene-co-acrylonitrile-co-acrylic acid), poly(alkyl acrylate-co-acrylonitrile-co-acrylic acid), poly(methylstyrene-co-butadiene), poly(methyl methacrylate-co-butadiene), poly(ethyl methacrylate-co-butadiene), poly(propyl methacrylate-co-butadiene), poly(butyl methacrylate-co-butadiene), poly(methyl acrylate-co-butadiene), poly(ethyl acrylate-co-butadiene), poly(propyl acrylate-co-butadiene), poly(butyl acrylate-co-butadiene), poly(styrene-co-isoprene), poly(methylstyrene-co-isoprene), poly(methyl methacrylate-co-isoprene), poly(ethyl methacrylate-co-isoprene), poly(propyl methacrylate-co-isoprene), poly(butyl methacrylate-co-isoprene), poly(methyl acrylate-co-isoprene), poly(ethyl acrylate-co-isoprene), poly(propyl acrylate-co-isoprene), poly(butyl acrylate-co-isoprene), poly(styrene-co-propyl acrylate), poly(styrene-co-butyl acrylate), poly(styrene-co-butadiene-co-methacrylic acid), poly(styrene-co-butyl acrylate-co-acrylic acid), poly(styrene-co-butyl acrylate-co-methacrylic acid), poly(styrene-co-butyl acrylate-co-acrylonitrile), poly(styrene-co-butyl acrylate-co-acrylonitrile-acrylic acid), poly(styrene-co-butyl methacrylate), poly(styrene-cobutyl methacrylate-co-acrylic acid), poly(butyl methacrylate-co-butyl acrylate), poly(butyl methacrylate-co-acrylic acid), poly(butyl methacrylate-co-butyl acrylate), poly(butyl methacrylate-co-acrylic acid), poly(acrylonitrile-co-butyl acrylate-co-acrylic acid), and combinations thereof.

7. The process of claim 1, wherein the carboxylic acid is selected from the group consisting of acrylic acid, methacrylic acid, itaconic acid, fumaric acid, maleic acid, cinnamic acid, and combinations thereof.

8. The process of claim 1, wherein the latex resin comprises particles having a size from about 80 nm to about 800 nm.

9. A process comprising:

contacting a latex selected from the group consisting of styrenes, acrylates, methacrylates, butadienes, isoprenes, methacrylic acids, acrylonitriles, and combinations thereof with compounds consisting of an acrylic acid and a stabilizer comprising beta carboxyethyl acrylate;

recovering a resulting latex resin, wherein when said latex is contacted with said stabilizer in the absence of said acrylic acid, a resin of larger particle size is produced and when said latex is contacted with said stabilizer and with said acrylic acid, a resin of smaller particle size is produced;

and contacting the latex resin with a colorant dispersion, and an optional wax dispersion to form toner particles having a volume average diameter of from about 2 microns to about 10 microns, and a circularity from about 0.9 to about 0.99, wherein the acrylic acid is present in an amount of from about 0.001% to about 10% by weight of the latex.

10. The process of claim 9, wherein the acrylic acid is combined with the beta carboxyethyl acrylate and then contacted with the latex.

11. The process of claim 9, wherein the acrylic acid is combined with the latex and them combined with the beta carboxyethyl acrylate.

12. The process of claim 9, wherein the latex is selected from the group consisting of poly(styrene-co-alkyl acrylate), poly(styrene-co-butadiene), poly(styrene-co-alkyl methacrylate), poly(styrene-co-alkyl acrylate-co-acrylic acid), poly(styrene-co-1,3-butadiene-co-acrylic acid), poly(styrene-co-alkyl methacrylate-co-acrylic acid), poly(alkyl methacrylate-co-alkyl acrylate), poly(alkyl methacrylate-co-aryl acrylate), poly(aryl methacrylate-co-alkyl acrylate), poly(alkyl methacrylate-co-acrylic acid), poly(styrene-coalkyl acrylate-co-acrylonitrile-acrylic acid), poly(styrene-co-butadiene-co-acrylonitrile-co-acrylic acid), poly(alkyl acrylate-co-acrylonitrile-co-acrylic acid), poly(methylstyrene-co-butadiene), poly(methyl methacrylate-co-butadiene), poly(ethyl methacrylate-co-butadiene), poly(propyl methacrylate-co-butadiene), poly(butyl methacrylate-co-butadiene), poly(methyl acrylate-co-butadiene), poly(ethyl acrylate-co-butadiene), poly(propyl acrylate-co-butadiene), poly(butyl acrylate-co-butadiene), poly(styrene-co-isoprene), poly(methylstyrene-co-isoprene), poly(methyl methacrylate-co-isoprene), poly(ethyl methacrylate-co-isoprene), poly(propyl methacrylate-co-isoprene), poly(butyl methacrylate-co-isoprene), poly(methyl acrylate-co-isoprene), poly(ethyl acrylate-co-isoprene), poly(propyl acrylate-co-isoprene), poly(butyl acrylate-co-isoprene), poly(styrene-co-propyl acrylate), poly(styrene-co-butyl acrylate), poly(styrene-co-butadiene-co-methacrylic acid), poly(styrene-co-butyl acrylate-co-acrylic acid), poly(styrene-co-butyl acrylate-co-methacrylic acid), poly(styrene-co-butyl acrylate-co-acrylonitrile), poly(styrene-co-butyl acrylate-co-acrylonitrile-acrylic acid), poly(styrene-co-butyl methacrylate), poly(styrene-cobutyl methacrylate-co-acrylic acid), poly (butyl methacrylate-co-butyl acrylate), poly(butyl methacrylate-co-acrylic acid), poly(butyl methacrylate-co-butyl acrylate), poly(butyl methacrylate-co-acrylic acid), poly(acrylonitrile-co-butyl acrylate-co-acrylic acid), and combinations thereof.

13. The process of claim 9, wherein the latex resin comprises particles having a size of from about 80 nm to about 800 nm.

* * * * *